United States Patent [19]
Frye

[11] Patent Number: 5,388,378
[45] Date of Patent: Feb. 14, 1995

[54] ANCHOR SYSTEM FOR COMPLETED STRUCTURES

[76] Inventor: Filmore O. Frye, 42 W. Blaine St., McAdoo, Pa. 18237

[21] Appl. No.: 177,122

[22] Filed: Jan. 4, 1994

Related U.S. Application Data

[62] Division of Ser. No. 64,437, May 21, 1993, Pat. No. 5,311,708.

[51] Int. Cl.6 .......................................... E04D 13/00
[52] U.S. Cl. .......................................... 52/23; 52/24; 52/4; 248/247
[58] Field of Search ............... 52/23, 24, 147, 148, 52/149, 547, DIG. 11, 520, 525; 248/361, 367, 247

[56] References Cited

U.S. PATENT DOCUMENTS

| | | |
|---|---|---|
| 129,805 | 7/1872 | Forman . |
| 181,518 | 8/1876 | Bollman . |
| 194,455 | 8/1877 | Montgomery . |
| 352,424 | 11/1886 | Owen et al. ............... 52/23 |
| 401,202 | 4/1889 | O'Gara ...................... 52/24 |
| 797,474 | 8/1905 | Walker . |
| 822,143 | 5/1906 | Mann . |
| 960,207 | 5/1910 | Slater . |
| 1,007,871 | 11/1911 | Horton . |
| 1,132,952 | 3/1915 | Maness ...................... 52/537 |
| 1,137,689 | 4/1915 | Allsteadt ................... 52/23 |
| 1,864,403 | 6/1932 | Bradley . |
| 1,932,555 | 10/1933 | McKee . |
| 2,372,827 | 4/1945 | Halicki et al. . |
| 3,293,808 | 12/1966 | Duncan . |
| 3,309,822 | 3/1967 | Dunkin . |
| 3,335,531 | 8/1967 | Grimelli et al. . |
| 3,415,019 | 12/1968 | Andersen . |
| 3,449,874 | 6/1969 | Beaupre . |
| 3,949,527 | 4/1976 | Double et al. . |
| 4,015,376 | 4/1977 | Gerhardt ................... 52/23 |
| 4,257,570 | 3/1981 | Rasmussen . |
| 4,288,951 | 9/1981 | Carlson et al. . |
| 4,365,453 | 12/1982 | Lowe . |
| 4,587,789 | 5/1986 | Tomason . |
| 4,697,393 | 10/1987 | Madray . |
| 4,796,403 | 1/1989 | Fulton et al. . |
| 5,109,641 | 5/1992 | Halan . |

*Primary Examiner*—Carl D. Friedman
*Assistant Examiner*—Winnie Yip
*Attorney, Agent, or Firm*—Richard C. Litman

[57] ABSTRACT

A system for securing a building structure, and various components of a building structure, to one another and/or to the building foundation or ground, is provided. The system includes apparatus for securing shingles against wind damage on a sloped, shingled roof; apparatus for securing the roof structure of a building to the adjacent upper wall structure; and apparatus for securing the roof structure directly to the foundation of the building or to the ground. The system is particularly adaptable to single and two story residential dwellings, such as single family homes and townhouses, and their related structures, such as garages and sheds, having sloped, shingled roofs. Installation of the complete system of the present invention provides substantial additional security for a structure against storm damage, particularly due to high winds.

9 Claims, 4 Drawing Sheets

ANCHOR SYSTEM FOR COMPLETED STRUCTURES

REFERENCE TO RELATED APPLICATION

This is a divisional application of U.S. patent application Ser. No. 08/064,437, filed on May 21, 1993 now U.S. Pat. No. 5,311,708.

FIELD OF THE INVENTION

The present invention relates generally to buildings and related structures, and more specifically to a system providing for the complete security and anchoring of all of the components of a completed family dwelling type structure or the like having a sloped roof, against high winds and related storm damage.

BACKGROUND OF THE INVENTION

In most areas of the nation, buildings and structures are subject to at least occasional high winds and severe storms. Hurricanes and tropical storms are relatively frequent occurrences with respect to the average life span of the typical building or dwelling, in the southeast and eastern parts of the country and occasionally hit the California coast and Hawaii as well. Tornados have been reported in every state in the union, including Alaska. Aside from such severe weather as mentioned above, severe thunderstorms can create localized gusts exceeding 100 miles per hour on occasion, and severe frontal systems can also cause extensive winds.

Accordingly, most areas of the country have developed building codes requiring minimum strength to provide at least some resistance to such severe conditions when they occur. While these requirements vary somewhat depending upon the specific area, they all are directed to new construction and do not address the need to anchor and secure a preexisting, completed structure. Of those devices and systems known, they primarily relate to means to anchor and retain temporary structures (e.g., mobile homes, sheds, haystacks and the like) and/or provide specialized components for use in the construction of new structures, which components are not readily adaptable for use in anchoring and securing portions of an already existing building.

The need arises for a system of anchoring and securing a preexisting, completed structure against high winds and storm conditions. The system must provide for the securing of shingles or like roof cover, securing the roof to the remaining structure, and securing the entire structure to the ground or foundation. Moreover, the system must be readily installable to the exterior of the structure without requiring any disassembly of the structure, and must be relatively inexpensive and easy to install.

DESCRIPTION OF THE PRIOR ART

U.S. Pat. No. 129,805 issued to Henry W. Forman on Jul. 23, 1872 discloses an Improvement In Portable Houses, comprising various specialized fittings for the assembly of the portable frame. These specialized fittings are used for the primary assembly of the structure, and thus the structure could not be assembled without them. The present invention comprises various fittings and the like which may be secured to a completed structure, which may stand alone without them.

U.S. Pat. No. 181,518 issued to Samuel M. Bollman on Aug. 29, 1876 discloses a Hay or Grain Cap comprising a multiple section, rigid pitched roof for temporary installation over a haystack or the like. Stakes tied to each corner may be driven into the ground to secure the device. No means of securing any shingles to the roof, securing the roof to an underlying building structure, or securing a building structure to its foundation is disclosed.

U.S. Pat. No. 194,455 issued to Robert Montgomery on Aug. 21, 1877 discloses Section-Roofs For Sheltering Grain, Etc. The device is similar to the Bollman patent discussed above, but depends primarily on weights suspended along the eaves for security. Additional security is provided by a stake driven into the hay or grain, and tied to the roof. A support structure for the roof is also disclosed, but no means of securing the roof to the support structure is shown.

U.S. Pat. No. 797,474 issued to James A. Walker on Aug. 15, 1905 discloses a Portable House utilizing specialized fittings to secure the structural members together temporarily. The fittings are integral with the balance of the structure, and cannot be removed while still leaving the structure standing. In other words, they cannot be applied to an existing, completed structure, as is the field of the present invention.

U. S. Pat. No. 822,143 issued to Alexander Mann on May 29, 1906 discloses a Stack Cover formed of a plurality of interlocked corrugated metal sheets, secured by a plurality of weights suspended from the eaves. No other securing means is disclosed.

U.S. Pat. No. 960,207 issued to Dwight C. Slater on May 31, 1910 discloses a Portable House along the lines of the Forman and Walker temporary structures discussed above. Again, the connecting members are integral with the remaining structure, and cannot be removed while still allowing the structure to stand, as in the case of the present invention.

U. S. Pat. No. 1,007,871 issued to James D. Horton on Nov. 7, 1911 discloses a Portable House along the lines of the Forman, Walker, and Slater patents discussed above. All of the structural connecting elements must be assembled with the structure, and cannot be added after the completion of the structure, as in the case of the present invention.

U. S. Pat. No. 1,864,403 issued to Charles B. Bradley on Jun. 21, 1932 discloses a House Anchor comprising two oppositely spaced cables extending over the roof and through sleeves installed through the roof at each corner of the house. No intermediate tiedowns are shown, nor is any means disclosed for securing shingles on the roof. Moreover, no structural ties between the roof structure and the wall structure are provided.

U. S. Pat. No. 1,932,555 issued to Philip L. McKee on Oct. 31, 1933 discloses a Greenhouse Eave (sic) Support And Drain Member comprising a vertical post having a specialized fitting atop thereof to which the rafters and eaves are secured. The glass sidewalls extend between the eaves and foundation, and the glass roof is supported by the rafters. Thus, the structure is permanent, and the fittings must be assembled before the completion of the structure, as in the cases of the Forman, Walker, Slater, and Horton patents discussed above.

U.S. Pat. No. 2,372,827 issued to William A. Halicki et al. on Apr. 3, 1945 discloses a Roof Structure for permanent or semi-permanent structures, in which the connecting member is permanently secured between the eaves and the proximate sidewall during construction. As the member is captured beneath a part of the eaves structure as the building is assembled, it cannot be later installed after completion of the building, as in the case of the present invention.

U. S. Pat. No. 3,293,808 issued to Joseph R. Duncan on Dec. 27, 1966 discloses a Prefabricated Cornice For Roof Construction essentially comprising a soffit support to which a soffit and other trim can be secured. The soffit support is secured to the overlying rafter end and provides no more security to attach the roof to the underlying top plates, than the conventional technique of nailing the roof structure to the underlying top plates. The soffit support and accompanying structure must be assembled to the structure at the time of construction, as in the case of many of the devices described above.

U. S. Pat. No. 3,309,822 issued to William H. Dunkin on Mar. 21, 1967 discloses an Exterior Anchoring Apparatus For Surface Sheet. The apparatus comprises a series of cables and fasteners extending from the ridge of a gabled roof downward to each of the eaves, rather than laterally across one gable panel as in the present invention. No means is disclosed for securing shingles on a shingled roof, nor is any means disclosed for securing the roof structure to the remainder of the building.

U.S. Pat. No. 3,335,531 issued to Nardie F. Grimelli et al. on Aug. 15, 1967 discloses a Tie-Down For House Trailers Or The Like. The apparatus comprises a series of specialized brackets providing for the securing of a rope(s) or cable(s) across the flat roof of a mobile structure, and ground anchoring means. No similarity is seen to the present invention, as the apparatus is not readily adaptable to a fixed, permanently constructed and located structure having a sloped roof.

U. S. Pat. No. 3,415,019 issued to Melvin A. Andersen on Dec. 10, 1968 discloses an Integral Soffit And Fascia Unit Of Synthetic Plastic. The title is descriptive of the limitations in comparison to the present invention, in that the device is integral with the construction (one edge of the soffit is secured under the lower row of shingles) and formed of a non-structural material.

U.S. Pat. No. 3,449,874 issued to Jean L. Beaupre on Jun. 17, 1969 discloses a House Anchorage comprising a plurality of brackets secured to a house with cables tying the brackets to ground anchoring points. While some of the brackets are secured to the underside of the rafters at the eaves, the outward extension of the cables therefrom would result in significant obstruction of the walls of the house when working near such walls was required. Moreover, no shingle securing means or means of securing the upper wall structure to the roof structure is disclosed.

U.S. Pat. No. 3,949,527 issued to Paul B. Double et al. on Apr. 13, 1976 discloses a Material Supported Cover And Method For Securing Said Cover To The Ground. The patent is primarily directed to a specialized anchor plate which is installable in the ground. In the embodiment directed to securing a structure to the ground, no means of securing shingles or one portion of the structure to another of a permanently installed structure is disclosed; the only structure disclosed is a mobile home.

U. S. Pat. No. 4,257,570 issued to Carl M. Rasmussen on Mar. 24, 1981 discloses a Tie Down Assembly for use in securing a camper shell to a pickup truck or the like. No means of securing building structural components together or to ground anchors is disclosed.

U.S. Pat. No. 4,288,951 issued to Denny L. Carlson et al. on Sep. 15, 1981 discloses an Auxiliary Insulated Roof System for mobile homes, in which a bracket providing for the securing of the insulation to the upper wall structure is disclosed. No shingle securing means, means for securing rafters to the wall structure, or securing any of the structure to the ground or foundation is disclosed.

U.S. Pat. No. 4,365,453 issued to Colin F. Lowe on Dec. 28, 1982 discloses a Frameless Metal Building And Building Components comprising various sheet metal panels and attachment fittings. While the resulting building is permanent or at least semi-permanent, the fittings must be installed at the time of construction and serve as the primary securing means for the structure; they cannot be installed or removed after construction, as in the case of the present invention.

U.S. Pat. No. 4,587,789 issued to Garry Tomason on May 13, 1986 discloses an Anchoring Means For A Prefabricated Roof or Siding Panel. The patent is directed to a means of securing specially formed, prefabricated roof or exterior panels from within, and does not lend itself to securing previously completed structures using standard construction methods and materials from the exterior after completion. Moreover, no means of securing the structure to a foundation or to the ground is disclosed.

U. S. Pat. No. 4,697,393 issued to Herbert R. Madray, on Oct. 6, 1987 discloses a Metal Building Construction along the lines of the fittings of the Forman, Walker, Slater, and Horton patents discussed above. The fittings must be installed during construction, and are inherent in the strength of the completed structure. They cannot be ether installed or removed after construction, as in the case of the present invention.

U.S. Pat. No. 4,796,403 issued to David A. Fulton et al. on Jan. 10, 1989 discloses an Articulating Roofing Panel Clip for securing standing seam sheet panels together. The clip(s) cannot be installed over an existing, completed roof structure and do not lend themselves to installation on shingled roofs or to secure any other structural components to one another or to the ground.

Finally, U. S. Pat. No. 5,109,641 issued to Peter Halan on May 5, 1992 discloses Roof Transition Flashing for installation at the juncture of a sloped roof and vertical siding. The flashing fails to anchor any of the structure to any other part of the structure, and must be installed during construction.

None of the above noted patents, taken either singly or in combination, are seen to disclose the specific arrangement of concepts disclosed by the present invention.

SUMMARY OF THE INVENTION

By the present invention, an improved anchor system for completed structures is disclosed.

Accordingly, one of the objects of the present invention is to provide an improved anchor system which is adaptable to secure or anchor the components of a completed building structure to the earth or foundation of the structure.

Another of the objects of the present invention is to provide an improved anchor system which is particularly adaptable to residential structures having sloped roofs, e.g., single family residences, townhouses, and associated structures, such as garages and sheds.

Yet another of the objects of the present invention is to provide an improved anchor system which provides external means for securing the shingles of a shingled roof against wind damage.

Still another of the objects of the present invention is to provide an improved anchor system which provides means for externally securing the roof structure of a building to the upper wall structure of the building.

A further object of the present invention is to provide an improved anchor system which also provides external means for securing the roof structure of a building directly to the ground or to the foundation of the structure, thus also securing the walls between the roof and the ground or foundation.

An additional object of the present invention is to provide an improved anchor system which makes use of readily available materials and components.

Another object of the present invention is to provide an improved anchor system which utilizes threaded fasteners exclusively wherever fasteners are required.

A final object of the present invention is to provide an improved anchor system for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
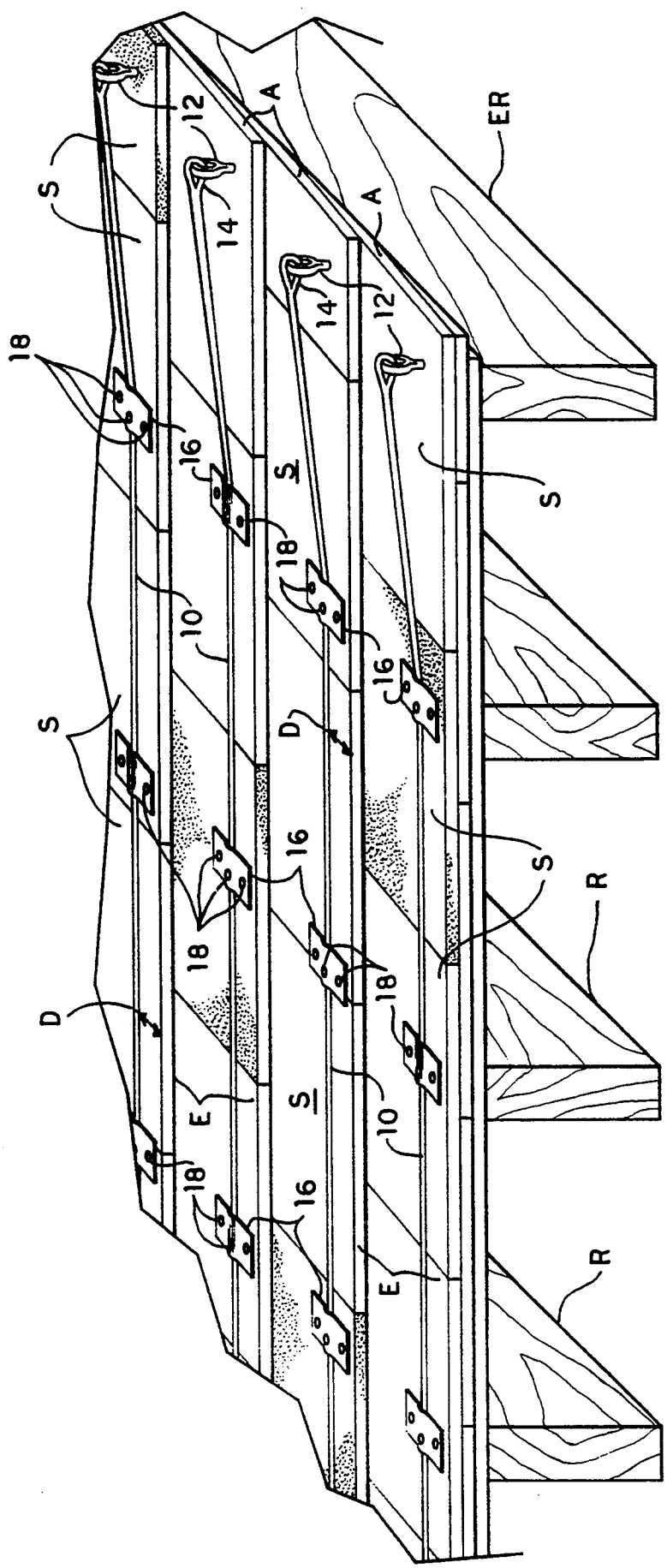
FIG. 1 is a broken away perspective view of a sloped, shingled roof, showing the details of the shingle anchoring system of the present invention.

Referring now to the drawings, the present invention will be seen to relate to a system providing for the securing of various components of a building structure together, and for the securing of a building structure to an underlying foundation or to the ground.

FIG. 1 of the drawings discloses a means of securing shingles on a sloped, shingled roof according to the present invention. It is well known that shingles are very susceptible to damage from storms with high winds, if the wind lifts the shingles and tears them away from the underlying roof sheathing. The problem lies in the securing of the lower edge of each of the rows of shingles on such a roof, as the upper edge of each row is secured beneath the adjacent overlying row up to the roof ridge. Accordingly, the present invention provides a means to secure the lower edge of each row of shingles by means of a plurality of transverse shingle securing lines or cables 10 which are installed laterally across the shingles S. Lines 10 are preferably installed a distance D approximately 1½ inches up slope from the lower edge E of each row A of the shingles S, in order to preclude the lifting of any of the lower edges E of the shingles S. Lines 10 are secured at each end rafter ER (one of which is shown in FIG. 1; the opposite end of the roof of FIG. 1 will be seen to be essentially a mirror image of the end shown) by an eye bolt 12. Eye bolts 12 are provided with threaded lag screw ends and screwed through the shingles S, roof sheathing thereunder, and into the end rafter ER, with each end of each line 10 drawn taut across a respective row A of shingles S and secured around a respective eye bolt 12 by a braided eye 14. Preferably, each line 10 is formed of a braided polyester material having an open core in its relaxed condition, thereby providing for ease of formation of the braided eyes 14 at each end. The braided polyester material has been found to be relatively durable and resistant to sunlight and other potential causes of deterioration, and at the same time relatively economical. Other materials may be used if desired, such as stainless steel cable, and preferably stainless steel anchors such as eye bolts 14 are used in order to provide corrosion resistance and long life.

Each of the lines 10 is further secured to each of the other intermediate rafters R between the two end rafters ER, by a plurality of overlying straps 16 which tie each line 10 down at each rafter R. Each strap or clamp 16 is secured on either side of its respective line 10 preferably by a stainless steel spiral threaded roofing nail 18, with a third like nail 18 driven through the center of the strap 16 and through the line 10 thereunder to provide additional security. Straps or clamps 16 are preferably copper for corrosion resistance; however, other materials (e.g. stainless steel) may be used as desired. Thus, every shingle S on the roof is secured, as each row A of shingles S will have an overlying line 10 extending transversely thereacross approximately 1½ inches up from the lower edge E. The lower edges E of the shingles are therefore prevented from lifting due to high winds or other causes, and yet the placement of the lines 10 a short distance D upward from the lower edges E of each row A of shingles S, serves to prevent the shingles S from curling back under the lines 10 to lift above the lines 10. The above discussed element of the structural security system of the present invention will be seen to be applicable to a completed structure, with no dismantling of any of the structure required for its installation on the structure. Moreover, one of the key elements of the present invention will be seen to be its use of threaded fasteners to secure each element or component; the use of standard, non threaded nails or the like is avoided. The threaded fasteners used throughout the system of the present invention provide a substantial increase in security between components thus secured.

While the above element of the system serves to prevent shingle damage or loss in high wind or storm conditions, and thereby prevent water damage to the interior of the structure and its contents, it does nothing to secure major structural components together to prevent major structural damage or destruction of the structure. One of the major causes of structural damage in extremely high wind conditions (hurricanes, severe thunderstorms and tornados, etc.) is the lifting and removal of the entire roof from the remainder of the structure. Considering that conventional frame structures rely primarily upon the weight of the roof to keep the roof in place, with the structure being secured only by a relatively few standard nails, it is not surprising that high winds can often remove a roof from a structure.

Figure 2:
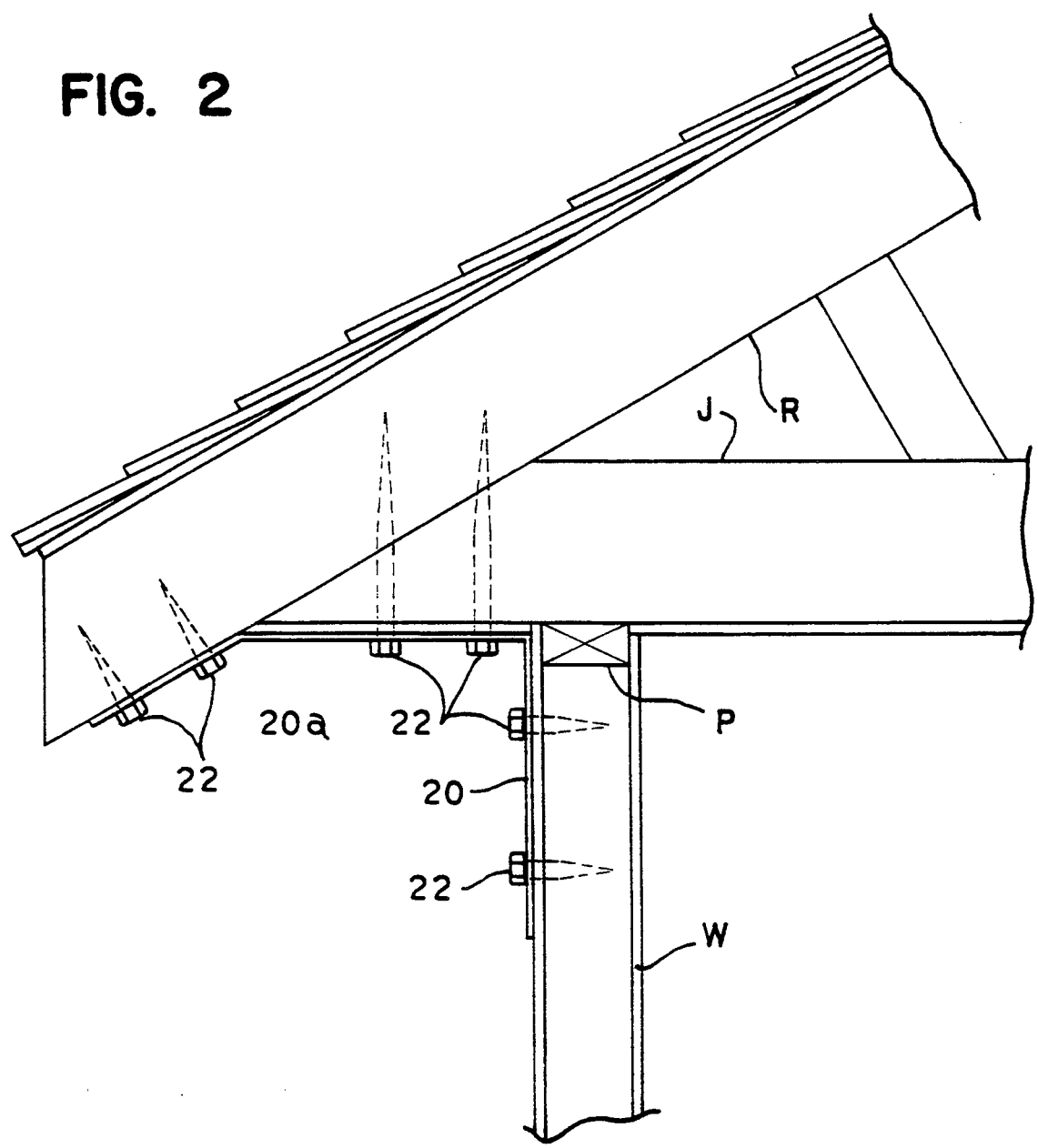
FIG. 2 is an elevation view in section of the upper wall and roof truss area of a structure, showing details of the wall to roof securing means of the present invention.

FIG. 2 of the drawings discloses a means for securing the roof of a structure to the adjacent upper walls. FIG.

2 discloses a section of a conventional framed structure, having substantially vertical wall studs W topped by a top plate P, with a ceiling joist J immediately adjacent and thereabove. A sloped rafter R is installed atop the joist J, in the conventional manner as shown in FIG. 1. However, rather than merely allowing the joist J and remaining roof structure to rest upon the upper plate P, an additional tie 20 is installed at the juncture of each of the wall studs W and ceiling joists J. These wall stud to ceiling joist ties 20 are installed externally to a previously completed structure, as in the case of the shingle securing system discussed above. Each tie 20 is preferably formed of a strap of stainless steel some 1½ inches wide, or equal in width to the standard 1½ inch thick "two by fours" generally used for wall stud construction. A right angle bend is formed in the strap or tie 20, enabling the tie 20 to be secured to both the upper portion of the wall stud W and also to the ceiling joist J and rafter R thereabove. By providing a strap or tie of some eight inches in length, the majority (preferably some five inches) may be secured to the vertical wall stud W, with the remaining length secured to the adjacent joist J, or through the adjacent joist J and into the rafter R thereabove. Threaded screws or bolts of sufficient length to penetrate substantially the majority of the depth of the secured members are provided, such as the lag bolts 22 shown in FIG. 2. Bolts 22 are again preferably formed of stainless steel for corrosion resistance and long life; however, other materials may be used if so desired. It will be noted that the lag bolts 22 penetrating the wall studs W are somewhat shorter than the lag bolts 22 penetrating the ceiling joist J and rafter R, due to the greater depth of material provided by the ceiling joist J and rafter R. By providing bolts 22 of proper length, it will be seen that all three of the major structural elements shown in FIG. 2—the wall stud W, the ceiling joist J, and the rafter R—may be tied together with a single tie 20. This provision of a single tie 20 to secure together all of the above elements, provides for additional security for a structure so secured. Further security may be provided by securing an additional bolt (not shown) into the upper plate P, immediately beneath the ceiling joist J. While the thickness of the soffit immediately beneath the eaves may not allow sufficient depth along the exterior wall for such an additional bolt, in many cases a double upper or top plate is installed and the three inch thickness thereby provided, serves to provide sufficient depth for an additional lag bolt into the lower one of the double top plate members.

For even greater security, the tie 20 may be provided in a longer length, having an extension 20a which may be bent to an angle complementary to the slope of the rafter R and secured directly thereto with additional bolts 22. The bolts 22 secured directly into the end of the rafter R and through tie extension 20a, serve to provide additional security over the portion of tie 20 which is held by bolts 22 which are secured indirectly to the rafter R through the joist J. In any case, the provision of means to secure each of the above structural components together by means of threaded fasteners 22, provides for a major strengthening of the upper portion of the structure.

Figure 3:
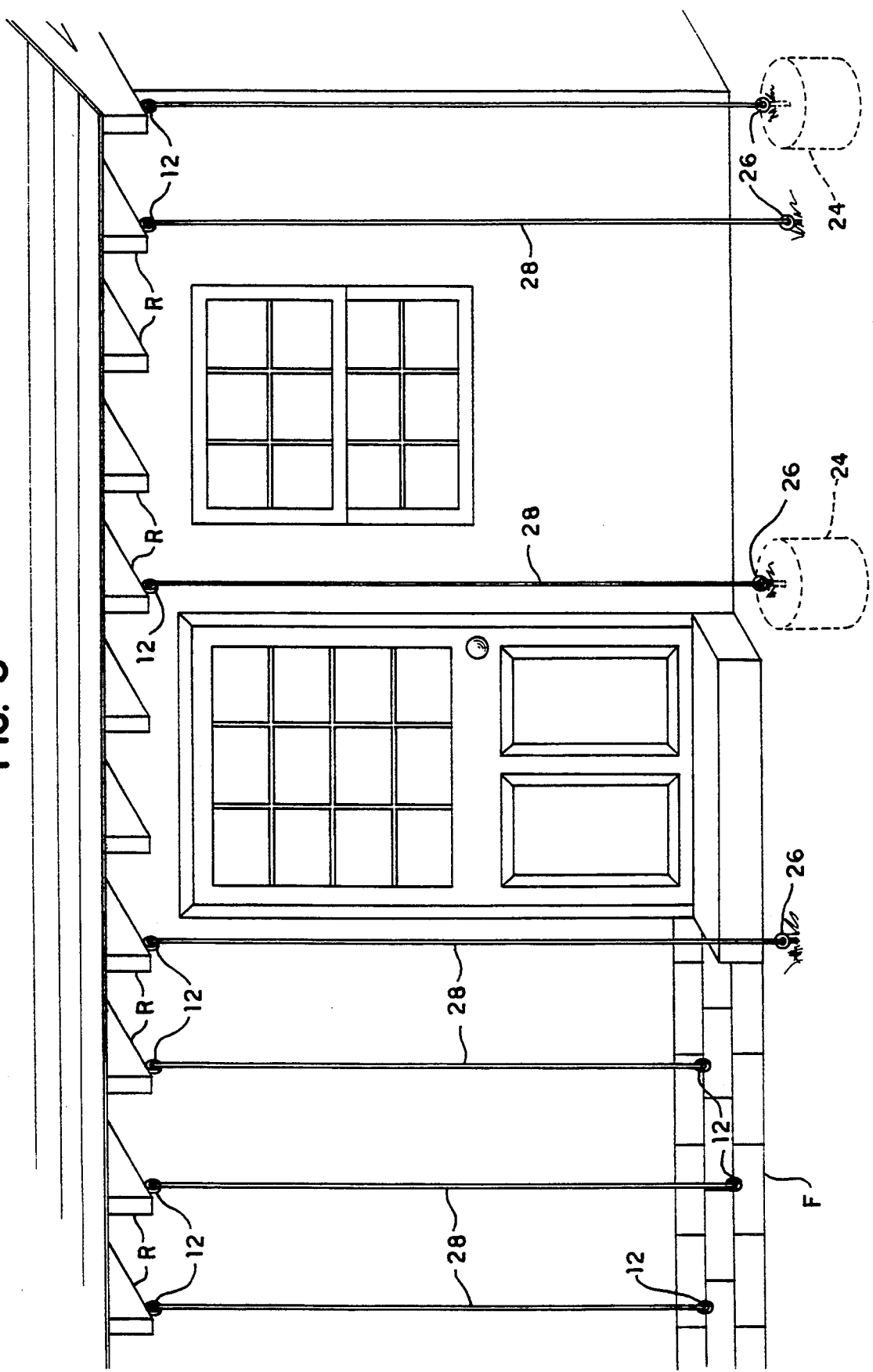
FIG. 3 is a perspective view of one side of a building structure, showing the means used to secure the roof structure directly to the foundation and/or ground.

While the above two elements of the present invention serve to secure the shingles to the roof of a structure, and to secure the roof of the structure to the upper walls, even further security is required in some cases. The present invention further provides for the securing of the roof structure directly to the foundation F or to ground anchors 24, as shown in FIG. 3. FIG. 3 discloses a plurality of eye bolts 12 which are screwed into the rafters R from the bottom, preferably on the order of four inches outward from the exterior surface of the wall. In order to preclude blockage of doorways, windows or other areas as desired, no eye bolts 12 are provided in those rafters R directly in front of such areas.

A like plurality of anchor points is provided in the foundation F or in the ground adjacent the foundation F, as desired and as appropriate for the conditions. In FIG. 3, a plurality of ground anchors 24, comprising large masses of concrete or other suitable anchor means (e.g., buried steel anchors or columns), with tiedown eyes 26 extending therefrom, is shown to the right side of the drawing, while additional eye bolts 12 are secured into the foundation F by means of lag shields or other suitable anchor means. Preferably, the underlying structural anchor means provided by ground anchors 24 are installed no more than six inches outward from the perimeter of the structure, in order to keep all tiedown lines or cables 28 close to the structure and substantially parallel to the walls, thus avoiding entanglement with such lines 28 by a person working near the exterior walls of the structure (e.g., gardening, etc.) The precise distance out from the walls for the installation of the eye bolts 12 into the rafters R, and the placement of the ground anchors 24 and foundation eye bolts 12, may be adjusted in order to ensure that the tiedown lines or cables 28 are substantially parallel to the walls and relatively close to the structure when installed.

Figure 4:
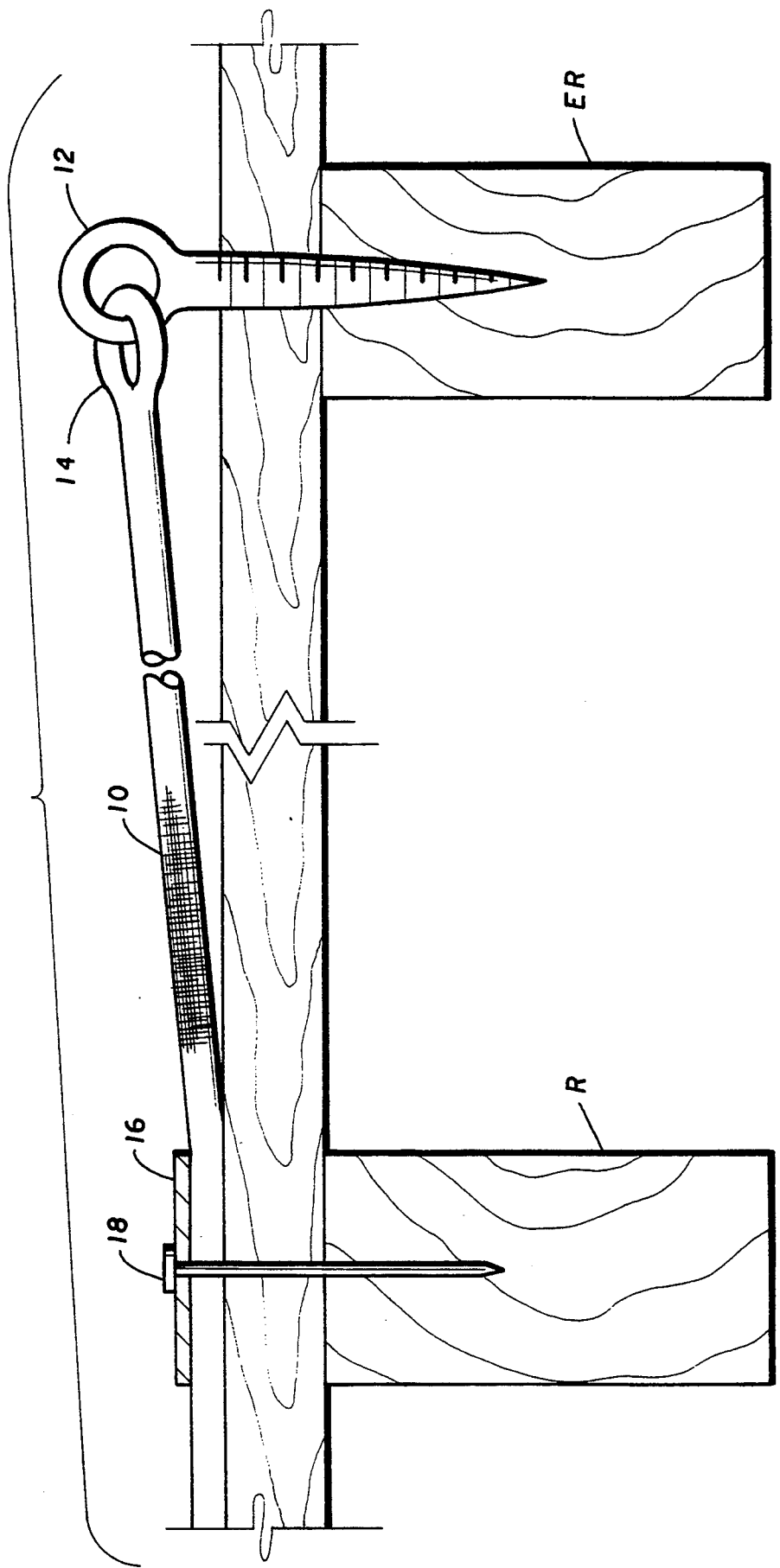
FIG. 4 is a front view in elevation of a roof and rafters of a structure which depicts the details of the presently claimed anchor system.

FIG. 4 depicts a cross-sectional view of a roof and rafters onto which the present invention is attached. Securing means 18 pass through line straps 16, shingles S (shown in FIG. 1), the roof, and into rafters R. Eyebolt 12 is shown threadibly attached through the roof to the underlying end rafter ER.

A plurality of tiedown lines or cables 28 equal to the number of eye bolts 12 installed in the rafters R along the eaves of the structure, is then installed, drawn taut in the manner of the shingle securing lines 10, and secured at opposite ends to a respective rafter eye bolt 12 and ground anchor tiedown eye 26 or foundation eye bolt 12, as appropriate, by means of a braided loop or eye 14, as shown in FIG. 1. Roof or rafter tiedown lines 28 are preferably formed of the same material as the lines or cables 10 used to secure the edges of the shingles S, as shown in FIG. 1. It will be seen that the securing of the rafters R directly to any underlying structure comprising the foundation F or ground anchors 24, results in the remainder of the roof structure, the wall structure, and any other interposed structure, being captured between the roof rafters R and the foundation F or ground anchors 24. Moreover, while each individual tiedown line or cable 28 may not provide sufficient strength to secure a large structure in a high wind, the plurality of cables or lines 28 provided by the present invention will be seen to provide sufficient strength and security to secure an average frame structure under most conditions of wind and storm which might be anticipated in most areas.

Accordingly, it will be seen that the present invention provides for the complete securing of a one or two story frame structure having a sloped, shingled roof, to the ground or to its own foundation to preclude shingle or roof damage, removal of the roof from the rest of the structure, or displacement of the structure from the foundation due to severe storms and high winds. The present invention lends itself well to single family homes and similar or related structures which have already been completed and which have been permanently and immovably constructed on a building site. The use of only external anchor and tiedown means, as well as the exclusive use of threaded fasteners and anchors throughout the present invention, results in a system which is both simple to install and which is also extremely durable and secure.

It is to be understood that the present invention is not limited to the sole embodiment described above, but encompasses any and all embodiments within the scope of the following claims.

I claim:

1. In an existing completed permanent frame structure having a sloped roof supported by a plurality of rafters and covered by a plurality of rows of shingles, each of the shingles having an upper portion secured by an overlying shingle and a lower portion resting atop an underlying shingle, an external anchoring system comprising:

a plurality of attachment means, said attachment means externally mounted to the rafters of the structure;

a plurality of shingle securing lines, each of said shingle securing lines having a first end and a second end, said first end attached to one of said plurality of attachment means, and said second end attached to another of said attachment means such that each of said securing lines extends tautly from one of said attachment means to the other of said attachment means in a longitudinal and horizontal direction across the roof, parallel and in contact with the plurality of rows of shingles;

a plurality of line straps, said line straps securing and overlying said shingle securing lines at points between said attachment means where said shingle securing lines cross over the rafters of the structure; and a plurality of securing means, each of said securing means passing through one of said line straps, through one of said shingle securing lines, through the shingles, and fixedly secured to a rafter of the frame structure, whereby said securing means providing additional security to prevent the broken of said single securing lines.

2. The external anchoring system according to claim 1 wherein said shingle securing lines are disposed across the lower portion of each of the shingles of each row of shingles.

3. The external anchoring system according to claim 2, wherein said attachment means are eye-bolts having threaded ends, said eye-bolts threadibly attached to the rafters of the structure through the shingles.

4. The external anchoring system according to claim 3, wherein said eye-bolts are threadibly attached to end rafters of the roof of the structure through the shingles.

5. The external anchoring system according to claim 4, wherein said shingle securing lines are formed of polyester.

6. The external anchoring system according to claim 5, wherein said shingle securing lines are attached to said eye-bolts by a braided loop at each eye-bolt.

7. The external anchoring system according to claim 4, wherein said eye-bolts are formed of stainless steel.

8. The external anchoring system according to claim 4, wherein said line straps are formed of copper.

9. The external anchoring system according to claim 8, wherein said securing means are stainless steel spiral-threaded roofing nails.

* * * * *